Oct. 6, 1942.  W. H. KRUEGER  2,297,899
STRUCTURAL FORM FOR CONCRETE AND LOCKING MEANS THEREFOR
Filed March 25, 1941  5 Sheets-Sheet 1
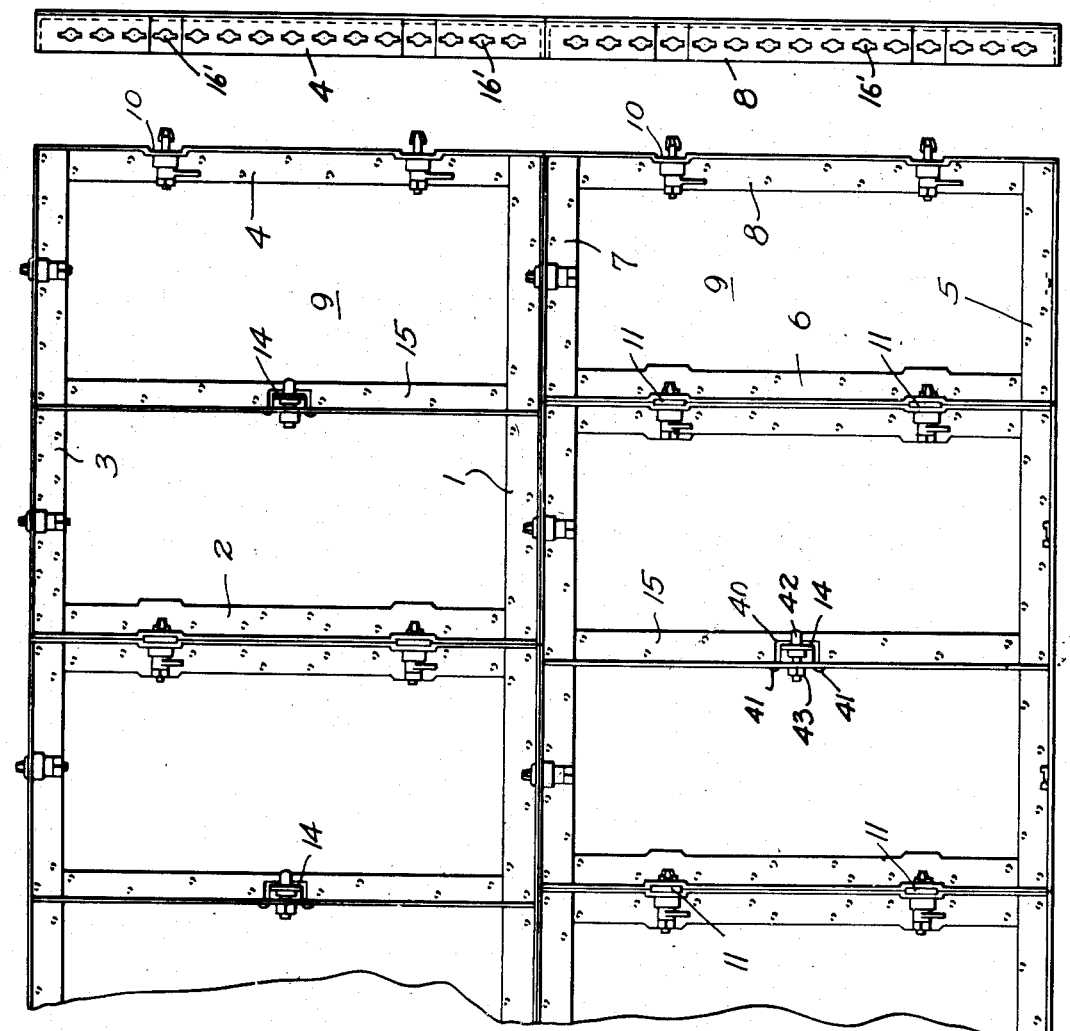

Oct. 6, 1942.   W. H. KRUEGER   2,297,899
STRUCTURAL FORM FOR CONCRETE AND LOCKING MEANS THEREFOR
Filed March 25, 1941   5 Sheets-Sheet 2
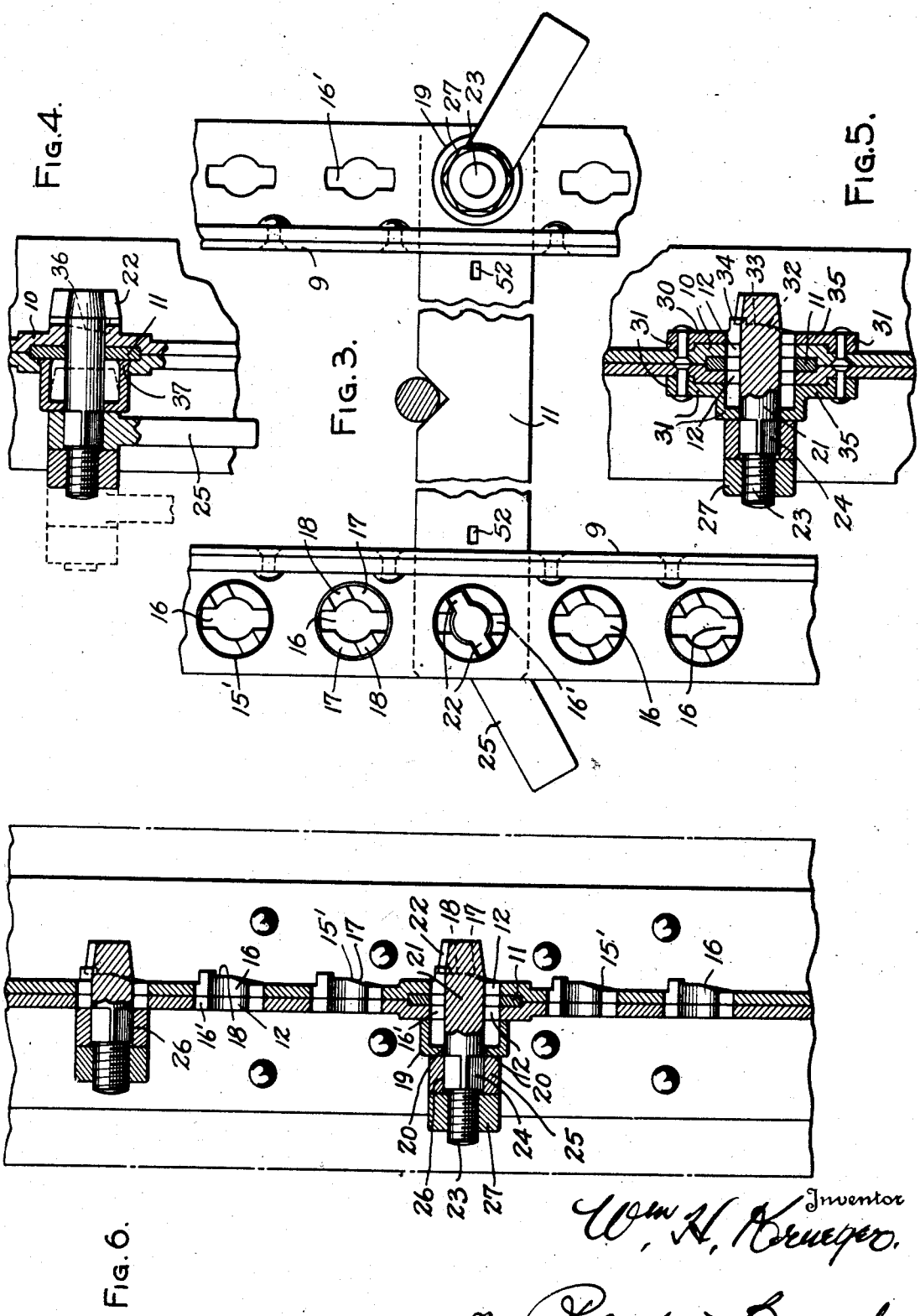

Oct. 6, 1942.   W. H. KRUEGER   2,297,899
STRUCTURAL FORM FOR CONCRETE AND LOCKING MEANS THEREFOR
Filed March 25, 1941   5 Sheets-Sheet 3
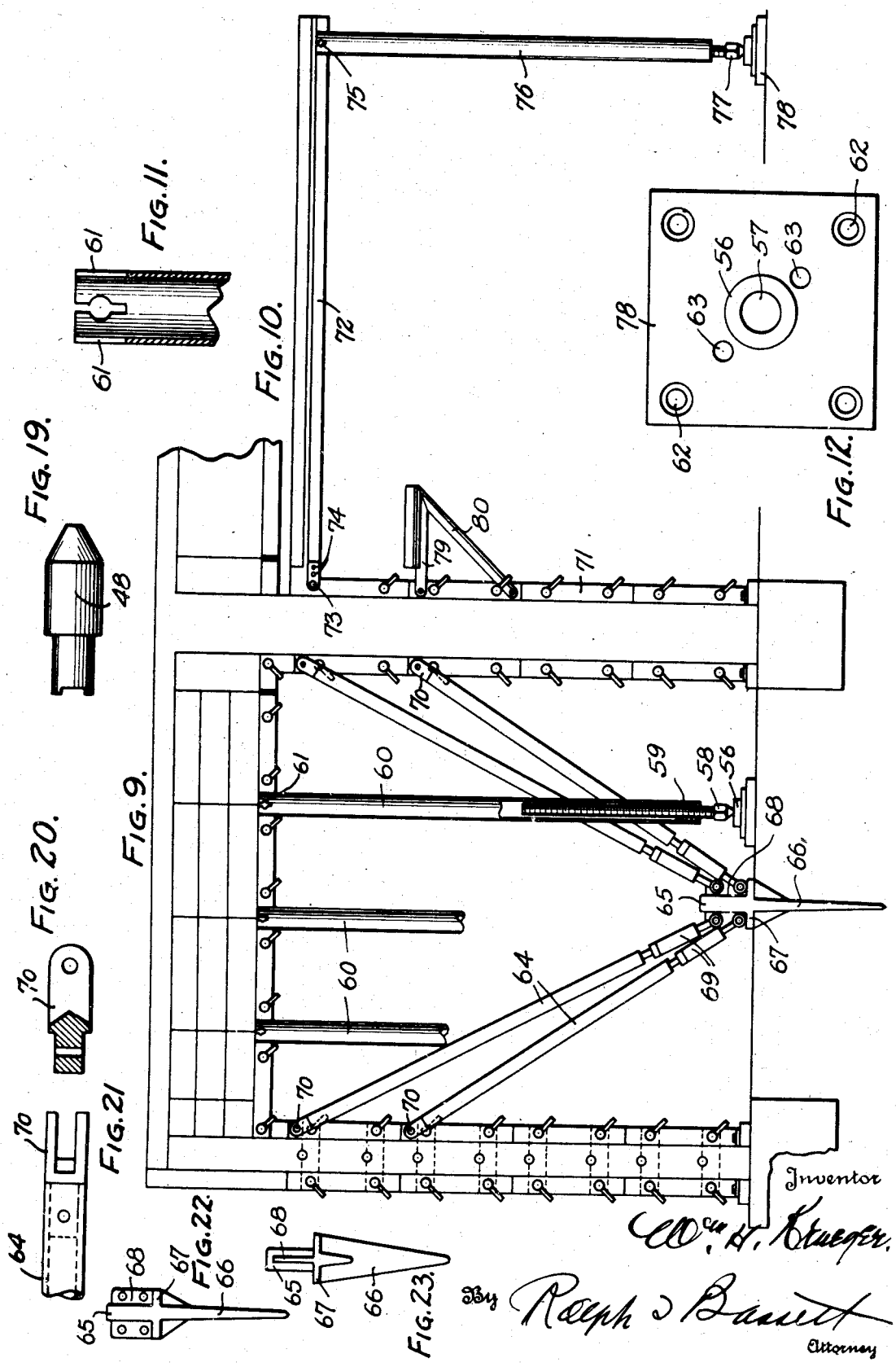

Oct. 6, 1942.　　　　W. H. KRUEGER　　　　2,297,899
STRUCTURAL FORM FOR CONCRETE AND LOCKING MEANS THEREFOR
Filed March 25, 1941　　　5 Sheets-Sheet 4

Oct. 6, 1942.  W. H. KRUEGER  2,297,899
STRUCTURAL FORM FOR CONCRETE AND LOCKING MEANS THEREFOR
Filed March 25, 1941   5 Sheets-Sheet 5
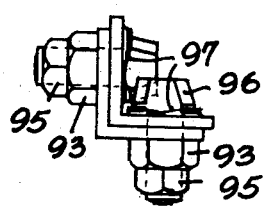
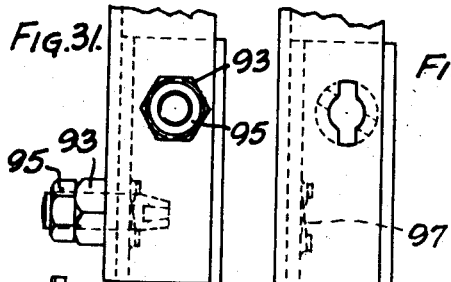
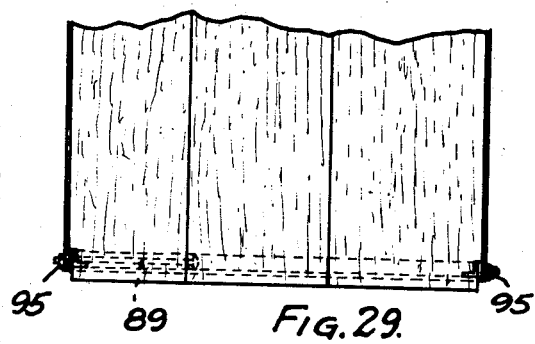
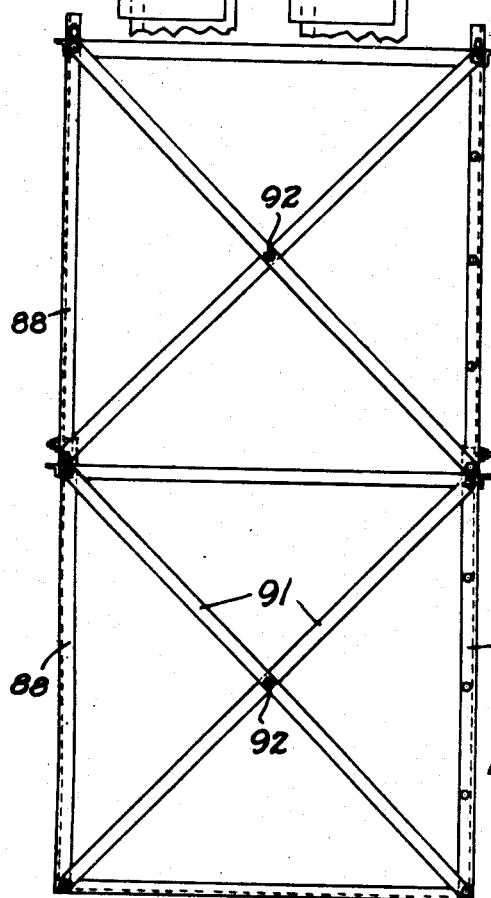
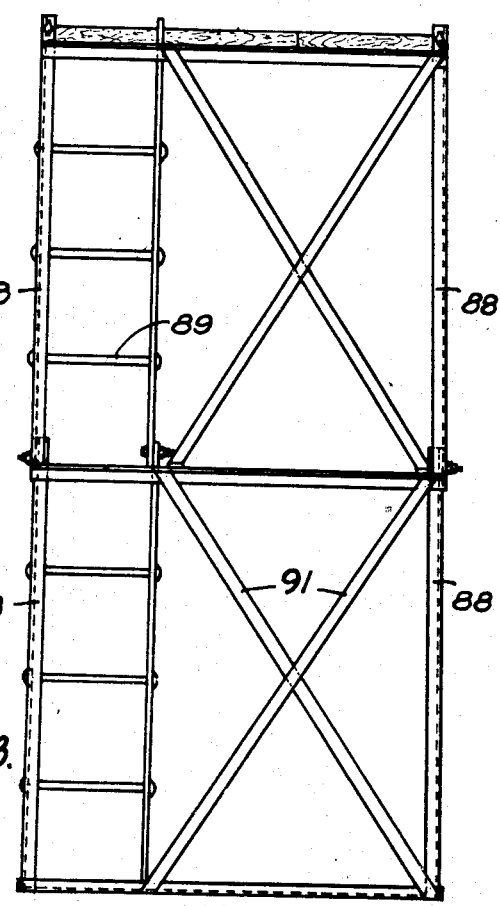
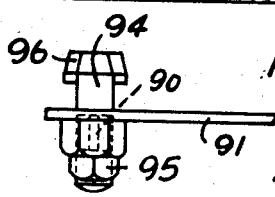
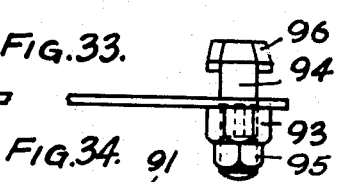
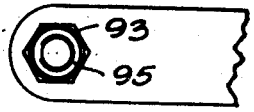
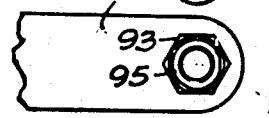

Patented Oct. 6, 1942

2,297,899

UNITED STATES PATENT OFFICE 2,297,899

STRUCTURAL FORM FOR CONCRETE AND LOCKING MEANS THEREFOR

William H. Krueger, Milwaukee, Wis., assignor, by direct and mesne assignments, to Flangelock Patents Corporation, a corporation of Wisconsin Application March 25, 1941, Serial No. 385,179

16 Claims. (Cl. 25—131)

This invention relates to improvements in locking and spacing means for structural forms and particularly such forms utilized in the construction of concrete assemblies.

The main object of the invention is to provide a form capable of use not only for its primary purpose of retaining and shaping concrete aggregate but also having features for facilitating its adaptation in auxiliary assemblies normally useful and desirable in concrete forming operations but which heretofore have necessitated supplemental equipment.

A further object of this invention is to provide a plurality of locking elements for securing the form sections and associated parts together, whereby the operations involved in the forming of concrete bodies is materially simplified and the expense considerably lessened.

Another object of the invention is to provide a structural form which embodies means for adapting the same for a multiplicity of uses in connection with the formation of concrete structures including operations involved in preparing for the formation of the structures, in the actual pouring of the structure and the subsequent finishing of the formation.

A further object of the invention is to improve the construction of such essential elements included in my structural forms as the combination lever lock, the auxiliary form lock, the center tie and the structural irons embodied in the variable framework.

A further object is to so construct the combination lever lock, which forms the main securing element for the structural parts that one of the main operating elements thereof may be an integral part of the main structural form and thus may readily be located at such points in the combination as desired or such element may be formed as an attachment, readily applied to the structural form at predetermined points in the assembly.

Another object of the invention is to provide a center tie or spacer form of such a design and construction that it may be applied to the structural iron comprising the spacer form in a manner enabling the use of additional reinforcing ties or brace members.

A still further object is to embody the various parts comprising the invention in such a manner and with such structural elements that they may be arranged and rearranged to provide either scaffold brackets or ladder brackets, these formations being capable of assembly from parts forming normal essential elements of the main structure.

Other objects such as the adaptation of the structure to analogous modifications suitable to concrete forming and finishing will more fully appear from the following specification and drawings, in which like characters of reference designate corresponding parts throughout the several views, in which Fig. 1 is a fragmentary elevation showing an assembly of form plates with the locking means and the tie rod lock;

Fig. 2 is an end elevation of Figure 1;

Fig. 3 is an enlarged fragmentary end elevation showing a tie rod between spaced form plate structures;

Fig. 4 is a section illustrating a tie rod lock modification;

Fig. 5 is a section illustrating another form of tie rod lock;

Fig. 6 is a vertical section through the form plates at a point intersecting the locks;

Fig. 7 is a plan view showing an inside corner form with the locking means therefor in locked position;

Fig. 8 is an outside corner form section with locking means in locked position;

Fig. 9 shows an assembly involving features of the present invention utilized in forming basement walls and the like;

Fig. 10 is an elevation illustrating upright brace assemblies for supporting scaffolds, joist and floor forms;

Fig. 11 is an enlarged section showing the forked head of a tubular brace;

Fig. 12 is a top plan view of a base plate for the upright brace;

Fig. 19 is an elevation of a dowel connecting member;

Fig. 20 is a section showing the upper end of one of the brace connections;

Fig. 21 is a fragmentary elevation of one of the ends of the brace members;

Fig. 22 is a front elevation of the anchor member;

Fig. 23 is a side elevation of the anchor member;

Fig. 27 is a side elevation of a scaffold arrangement;

Fig. 28 is an end elevation of the scaffolding shown in Fig. 27;

Fig. 29 is a fragmentary top plan view of the scaffolding arrangement;

Fig. 30 is a fragmentary elevation of two of the connecting members of the scaffolding assembly member;

Fig. 31 is a fragmentary elevation of two of the connecting members of the scaffolding assembly member showing the connecting elements in position;

Fig. 32 is a top elevation of the disclosure of Fig. 31;

Fig. 33 is a side elevation of one of the connecting units used in the scaffolding assembly, and Fig. 34 is a bottom view of the connecting unit shown in Fig. 33.

Figure 13:
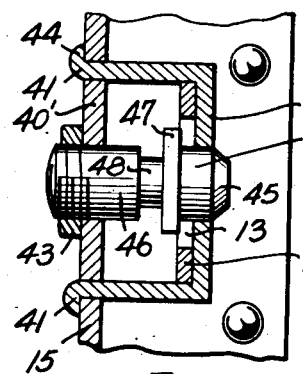
Fig. 13 is a section through a center tie rod lock illustrating a tie rod lock in elevation.

The broad application of certain of the main features of the development are illustrated in Figures 1 and 2 representing form plate assemblies for concrete structures with locking devices. The assembly in Fig. 1 includes the square form plates defined by angle members 1, 2, 3 and 4 and the rectangular form plates defined by angle members 5, 6, 7 and 8. The size and shape of the individual assemblies is merely a matter of choice, it being sufficient that they function cooperatively to constitute a main form of the desired character. The corresponding faces of the structural angle members are in substantially parallel planes, the inner faces overlying one another to provide a substantially flat surface for attachment by rivets or welding to form sheeting 9, as is conventional in such developments (Fig. 3). The outwardly projecting flanges of the structural angles define the outer marginal edge of each assembly and, as clearly shown, snugly abut in assembly to complete the desired form in a neat and positive manner. The vertical outwardly projecting flanges of each plate form connected flanges and are offset at predetermined points in their length as at 10 (see Figures 1, 3, 4, 5 and 6), so that when assembled these offset flange portions will register to provide pockets to receive the ends of tie rods 11. The offset flange portions 10 are formed with registering openings 12 (Figs. 5 and 6) and these openings align with openings in the tie rod extremities to permit the insertion of the lock bolts to be hereinafter described. To permit the utilization of an additional intermediate tie or spacer rod 14 in each individual plate section, and in this manner prevent bulging during pouring of the aggregate, a center angle brace 15 is employed in the larger frame assemblies. The securing means will be more fully hereinafter described. The upper and lower abutting flanges of the frames are formed with registering openings to permit the use of auxiliary locks at essential points to secure the parts in proper relationship in the manner necessary to support the imposed load.

Now describing that element securing the tie rods at their extremities between the offset associated parts of the form frames, attention will be first directed to Figure 6. In order to provide for the application of the locking means the opposed flanges, including the offset portions, are provided with aligned openings of suitable diameter to permit the arrangement of parts essential to the operation of the securing device. The openings in each one of each pair of opposed flanges have seated therein by means of rivets, welding or other securing methods cam rings 15', formed with centrally positioned key slots 16 more clearly shown in Fig. 3 and outwardly projecting opposed cam surfaces 17 terminated in flattened portions 18, the latter being at diametrically opposed points. The offset portions of the other opposed flange of the adjacent frame members is provided with similarly positioned key slots 16' and enclosing these key slots are the retaining cups or caps 19 which are each welded or riveted in place. The outer wall of the retaining cap or cup 19 is formed with a central opening 20 of substantially the same diameter as the central portion of the key openings heretofore referred to, and this opening 20 is in alignment with the central portion of the key openings to permit a sliding movement of the bolt portion 21, of the lock bolt. The lock bolt includes the central cylindrical portion 21, the wings 22 providing T projections at the outer extremity of proper dimensions to snugly pass through the key slots, the threaded outer extremity 23, and the intermediate key portion 24. The key portion 24 may be shaped as desired or provided with suitable flanges to permit snug fitting engagement of the levers 25, which latter are provided with openings 26 to engage this part of the structure and to permit rotation of the bolt by the same. On the threaded extremity 23 the lock nut 27 is arranged to permit adjustment of the related parts. Thus there is provided the cam surfaces 17 for engaging the adjacent under faces of the winged projections 22 of the lock bolt to cause the latter to securely bind the adjacent flanges in close fitting relation upon operation of the lever 25, and the flattened surfaces 18 adjacent the inclined faces which insure a substantially locked relationship between the parts. The stops 34 operate to insure positive and accurate adjustment. Accurate adjustment between the fitted faces is obviously obtained by manipulation of the lock nut 27. Intermediate the offset portions 10 of the abutting flanges the registering key slots employ detachable lock members when and where necessary, i. e., the lock members are capable of being entirely separated from their respective flanges as distinguished from the lock members at the offset portions where the lock members are carried by the caps 19 as will more clearly hereinafter appear. When the plates are to be separated, the movement of the lock levers 25 causes the T-heads of the bolts to register with the T-slots so that the bolt can then readily be retracted through the key slots carried by the flanges formed with the cam faces, the retraction being completed to the extent of moving the T-head within the walls of the retaining cap 19. At this point the outer end wall of the cap being formed only with a round opening accommodating the central portion of the bolt, will secure the latter against further movement and consequent loss during transit or manipulation of the parts.

In Fig. 5 the same purpose is accomplished by a modified construction. In this figure the plates are provided with aligned key slots at essential points and with offset portions to accommodate tie rods as shown. The cam faces are provided in the modification of Fig. 5 by the use of plates 30 each of which are flanged at 31 to snugly embrace the outer faces of the offset portions of the adjacent offset wall. The plates 30 are further formed with key slots which register with the key openings of the flanges. The plate 30 has formed on opposite sides of each of these key slots projecting cam faces 32 substantially flat portions 33, and stops 34. The opposed flange of the frame is key slotted, and is provided with the plate 35. The plate 35 is of substantially the same shape and dimension as the plate 30 of the opposing flange but includes the central projections 31 forming in substance a retaining cup or cap corresponding to the cap 19 of Figure 6 for the reception of the T-head 22 of the bolt 21 in the manner described with respect to Fig. 6. The form shown in Fig. 5 is a relatively simple adaptation, permitting the use of quickly assembled relatively small plates, which may be manufactured by stamping or other suitable operation. In this form the plates which embody the essential elements for the operation of the lock bolt can be secured in position when and where necessary, by riveting or other means and tend to add material strength and rigidity when applied in position.

In Fig. 4 a further modification is illustrated. In Fig. 4 the flange of the angle member of the frame is stamped to provide the necessary cam surface 36 and associated parts, and the housing or cap of the opposing flange may include projections 37 which act as rivets when extended into perforations provided in the flange member. It will be noted in Fig. 4 that the faces of the projecting T head 22 are beveled towards the extremity of the bolt structure to facilitate insertion of the same through the key slots in the plates and tie rods.

From the foregoing it will be observed that the essential features in each of the modifications is identically the same, the changes being in different methods for providing this means. In each instance the abutting flanges must be provided with the proper aligned openings for permitting the longitudinal movement of the T-shaped winged extremity of the tie bolt. In each modification the same tie bolt is used and can be retracted when the frames are disassembled to entirely clear the related parts, without the possibility of the bolt being ultimately dislodged or removed.

Figure 14:
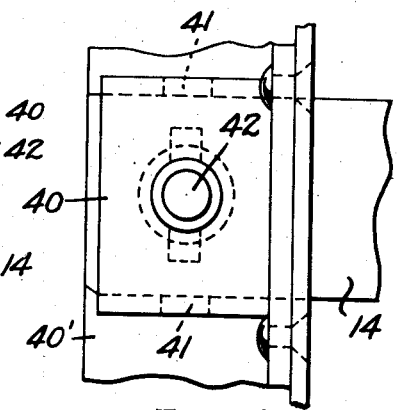
Fig. 14 is a plan view of the disclosure of Fig. 13.
Figure 15:
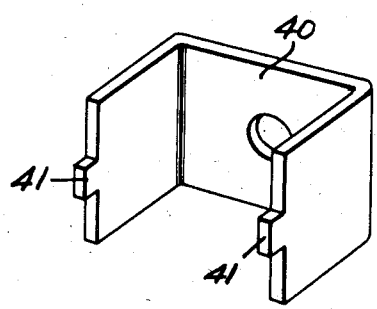
Fig. 15 is a perspective view of the U-shaped member shown in Figs. 13 and 14.

The center tie rod lock illustrated in Fig. 1 embodies a retainer plate 40 of angular form, having its legs provided with lips or extensions 41 which extend through perforations in the projecting flange of the angle 15 and are riveted therein. The retainer plate 40 is formed with a central opening through which the dowel pin 42 projects. The tie rod 14 is formed with the usual T slots at each end.. The dowel pin is threaded at one end to receive the nut 43 for withdrawing or retracting the dowel pin from its passage through the tie rod 14 and the retainer plate. In Figs. 13 and 14 this center tie rod lock is illustrated more fully, but modified in that the free end is not provided with threads for an adjusting nut. In this form of the invention i. e., the form shown in Figs. 13 and 14 the retainer plate 40 has its legs extending through the flange 40' of the angle 15 and riveted thereto as at 44. The beveled cylindrical head 45 of the dowel pin 46 fits through and within the circular area of the slotted hole 13 in the tie rod 14 and thence is passed through and fits snugly in the round hole in the retainer plate 40 more clearly illustrated in Figure 15. The flange 47 of the dowel pin 46, holds the same laterally with relation to the exterior surface of the tie or spacer rod 14. The slot 48 in the dowel pin 46 is sufficiently wide and deep to allow of engagement with the thickness of the flange 40', thus securing the dowel pin in stationary unlocked position. The outwardly extending circular end of the dowel pin 46 fits through and reciprocates within a circular hole provided therefor in the flange 40', of the aforementioned center stiffening angle comprising a part of the form plate. Thus it will be seen that when the nut is not used, the dowel pin 46 may be brought into partly, or entirely disengaged position in which the slot 48 therein engages the flange 40', either by driving the end 45 thereof outwardly, or by engaging the opposite end and pulling it into partly, or such entirely unlocked position.

Figure 16:
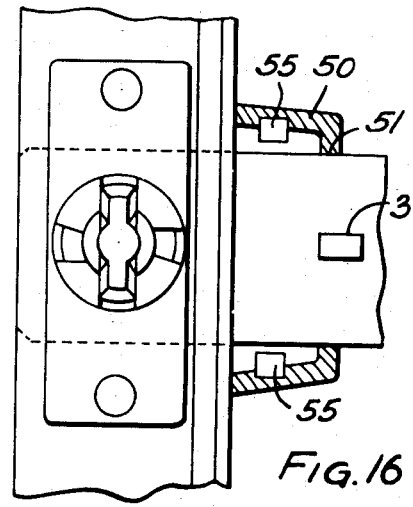
Fig. 16 is a fragmentary elevation partly in section showing the caps for the ends of the tie rods.
Figure 17:
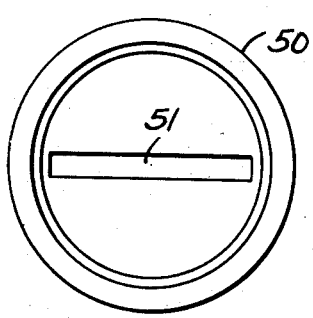
Fig. 17 is a bottom plan view of the cap shown in Fig. 16.
Figure 25:
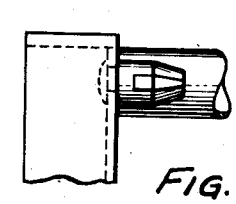
Fig. 25 is a fragmentary elevation of a bracket connection.
Figure 26:
Fig. 26 is a fragmentary elevation partly in section of the extremity of a connecting member.
Figure 18:
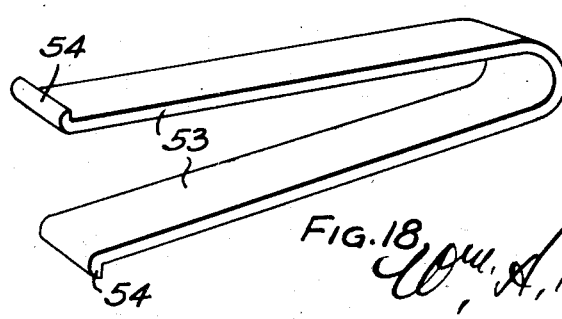
Fig. 18 is a perspective view of an implement used in removing the cap member.

In Figure 16 there is illustrated an assembly adaptable for use in the construction of tanks and other similar devices which require a smooth or water-proofed finish or both. In such structures it is necessary that the ends of the tie rods be removed and the openings created by such removal properly covered or filled by the necessary cementing method. To accomplish this the conical cups 50 are provided. These conical cups are formed with an axial rectangular opening capable of snugly receiving an end of a tie or spacer rod. The shape of this cup and the formation of the opening 51 therein is illustrated in Figure 17. The larger diameter of the conical cup will be positioned flush with the inside of the wall of the wall form by means of a wedge or key which extends transversely through a hole 35 in the tie rod adjacent to the end wall of said cup. The result of this is the provision of a device firmly locked and properly positioned at the end portion of the tie rod and which device inherently functions to create a unit wherein the tie rod is properly locked in position and spaced with respect to the respective walls of the form. After the concrete aggregate has hardened sufficiently and it is desired to remove the parts of the form therefrom the tie rod lock handle 25 is moved to unlocked position. The tie bolt 21 is withdrawn from the lock cam plate and the tie or spacer rod 11. This will permit the removal of the entire form or such units thereof as it may be desired to withdraw on either side of the tie or spacer rod or rods in question. Obviously the tie or spacer rods remain as reinforcements within the concrete mass and the protruding ends of the tie or spacer rods are sheared off at the exterior surface of the concrete wall or structure. At this stage the conical cups which have been used are removed from the tie rods by means of the device illustrated in Figure 18. This device includes the spring arms 53 and projecting hook-like terminals 54 which are adapted to expand into the sockets 55 of the cups for engaging the latter and facilitating their assembly. The openings formed by the removal of the cups from the tie rods and the shearing off of the tie rod extremities are filled with concrete and trowelled to provide the essential smooth leak-proof exterior finish.

In Fig. 9 there is illustrated an upright brace for supporting scaffolds, joist and floor form assemblies. This upright brace includes a base plate illustrated in plan view in Fig. 12, and comprises a central projection 56 in which is formed a conical depression 57 for receiving the tapered bottom extremity of the adjusting screw 58. The adjusting screw 58 is threaded into the internally threaded end portion 59 of the tubular member 60. The upper end of the tubular member 60 is slotted as illustrated in Fig. 11 at 61, the slots being in both walls of the tubular structure and aligned at diametrically opposed points to bifurcate the same at this extremity. These slots are adapted to engage with depending flanges of form plates, or other similar projections utilized in providing supports for scaffolds or platforms or floor form plates. By this structure a relatively light but sturdy adjustable upright is provided which may be moved quickly and adjusted efficiently to secure the desired objective. The holes 62 provided at the four corners of the base plate are for securing the same to necessary and suitable footings. The other two diametrically oppositely arranged holes 63 are for the reception of dowels 48 shown in Fig. 19, to extend another adjustable upright brace of the same type, positioned in a similar base plate, above a T bar scaffold support hereinafter more particularly referred to. The diagonal braces 64 radiate from the wedge shaped ground brace or stake 65. This stake is formed with a wedge shaped lower extremity 66 to permit its being driven into the earth, horizontal base plate portion 67 and radiating flanges 68 to which are pivoted the angle braces 64. The braces 64 are adjustable by means of the turnbuckles 69 and have their upper ends bifurcated at 70 for receiving lock pins which extend therethrough and into suitable flanges or other analogous elements.

In Fig. 10 there is illustrated a further adjustable supporting scaffold for joist and floor assemblies. In this structure the wall form is illustrated at 71 and to this wall form there is attached a T bar scaffold support 72. The purpose of this structure is to furnish support for the scaffold boards. The T bar 72 is provided with an extremity 73 having a series of openings 74 for cooperation with corresponding openings in any flange of a wall form. Thus the T bar scaffold supporting element 72 is provided with hinging means and it will be evident that by means of rivets or the like passing through the holes 74 and corresponding holes in the supporting element that the assembly may be firmly secured on either side of the vertical web of the scaffold supporting bar. At the outer or free end of the T bar 72 there is attached by means of the pin or bolt 75 the adjustable post or standard 76, the latter corresponding structurally to the upright bracket 60 shown in Fig. 9. The post or standard 76 is as previously described in the nature of an adjustable tubular upright brace, the screw 77 and the base plate 78 providing for the essential adjustment.

In Fig. 10 there is illustrated a set-up scaffold bracket adapted to be secured to one of the projecting flanges of a form plate assembly by means of bolts extending through holes provided at the ends of the upper and lower arms 79 and 80. The structural elements of this set-up bracket is such that the openings in the arms 79 and 80 will accurately register with any of the spaced openings provided in the flanges of the form plates. By attaching this set-up scaffold at the openings of a flange of a form plate, and wherein the openings of the flange are provided with the heretofore described bevelled locking faces which cooperate with the securing means also heretofore described, it will be apparent that not only can a quick attachment be made at any desired point but the attachment is essentially extremely rigid and safe.

In Figs. 7 and 8 there is illustrated an inside corner form section, with the locking means in locked position, and an outside corner form section with the locking means similarly positioned. The locking means are conventional to other phases of this development with the exception that set screws 81 are illustrated to fix the locking bolt 82 in unlocked position so that the same may not be damaged in transportation or when stored. The set screw cooperates through the threaded opening formed in the bolt retainer cup 83. In Fig. 7 it will be noted that the lock bolt retainer cup is provided with diametrically opposite extending lips 84 which pass through corresponding openings in the flange 85 and are riveted over as shown. The reason for riveting such cups to the flange is to keep the locking device integral with the form plate. This avoids disassembling and reassembling of the locking means relative to the form plate.

Figure 24:
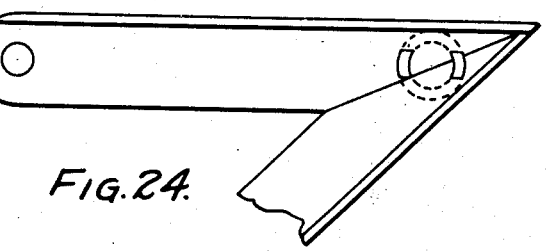
Fig. 24 is a fragmentary elevation of a bracket.

In Figs. 27 to 34 there is illustrated a scaffolding in which a common locking element involving a locking means constituting one of the inventive thoughts of the present development forms the key to the assembly. Figs. 23 and 24 show two sections of scaffolding assembled and secured together by means of a common locking element. It will be noted that the four uprights 88 of the several sections are inclined inwardly slightly in their structure so that the butt end of the section which is superimposed upon the one beneath will telescope over the top of the lower upright. It is not intended that the character of bracing employed illustrated shall represent the ultimate in construction. This bracing depending upon the use to which the scaffolding is to be placed. In Fig. 23 the ladder structure 89 is formed an integral part of the scaffolding and is embodied within the bracing means. Certain of the minor braces in the assembly may be welded at their points of junction, this however, does not concern the present development insofar as the inventive thought is concerned. The inventive thought is mainly in the utilization of the same locking means that has heretofore been described in connection with other structural applications. Referring to Figs. 33 and 34 there is to be found a typical example of the structure in question. In these structures brace elements are illustrated embodying the same general type of lock. In these views, the distal, threaded nut and exteriorly squared portion 90 of the locking bolt are passed through the round hole at either end of the brace 91. Similar locking means it will be noted are illustrated at 92 which reference character illustrates the point of intersection of two such brace members. By means of the turn nut 93 having an internally squared surface which fits over the aforementioned exterior squared surface of the locking bolt 94 a means is provided to turn the bolt. The adjusting nut 95 is secured upon the screw threaded end portion of the bolt 94 and retains the related parts in juxtaposition with respect to the braces 91. It will be understood that the adjacent flanges of the respective superimposed section are firmly locked together by means of the same locking device. These locking devices are illustrated in locked position as applied to the superimposed frame structures, in Figs. 30, 31 and 32. In each instance a quarter turn of the nut 93 which fits on the squared surface of the bolt will cause the winged portions 96 to ride up the inclined surfaces 97, to the level surface and against the stop stamped out from the opposing surface of the flange. As heretofore described in similar assemblies the degree of tension of such locking means may be effected by the adjusting nut 95. In this scaffold formation it will be noted that the bottom section is provided with substantially the same staple base and this is accomplished by providing one flange of the angle iron bottom brace flush with the base surface. It will thereby be possible to secure such bottom section by any usual and staple means to such a foundation as may be available and thereby prevent the danger of the scaffold tipping. Where the scaffold is to be extended to a substantial height, auxiliary means for anchoring the bottom section to the ground may be used.

By the means heretofore described a form has been provided for retaining concrete aggregate during molding operations, the form embodying a plurality of fastening means including the combination lock lever, the center tie or spacer form lock, the auxiliary form lock and the scaffold locking means each of which embodies certain common characteristics whereby their use facilitates the setting up and knocking down of the forms and the attachment of auxiliary features particularly adaptable in concrete finishing operations.

In addition to the uses illustrated in the present application, the invention is adaptable for locking together pre-fabricated sections of columns, frames, platforms, runways, bleachers, judging and reviewing stands, stairways, causeways, bridges, viaducts, hoist towers, watch towers, airship snares, traps, mooring masts, and the like.

It will also be apparent from an examination of the disclosure aforesaid that an assembly of forms locked together by the locking means shown and described essentially provides means whereby form sections may be removed in order to effect changes in construction or design or in order to provide doors or windows or lateral beam supports.

The instant invention also provides means whereby wear on the various parts may be accommodated through the simple manipulation of adjusting nuts provided for the various locks.

In dismantling the structure, i. e., forms embodying the present development it will be noted that the combination lock levers are retained as parts of the various form sections to which they are connected, the auxiliary locks being removable and replaceable when and where necessary to provide essential reinforcement where the weight of the concrete aggregate is so concentrated as to cause the forms to have a tendency to separate.

By reference to Figure 1 it will be noted that the sections forming the various panels are assembled so that the joints between the sections alternate with the center braces. This is particularly apparent by reference to the junction of the angle members 2 which are superimposed with respect to the angle member 15 which latter forms the intermediate brace of the lower panel section. By reference to this same figure it will be obvious that any of the individual panel sections may be removed either for the purposes above defined or to permit the attachment of scaffolds and other accessories essential in a finishing operation. Should certain of the panel sections be removed the protruding extremities of the ties 11 will be available for connection with hangers, brackets, ladders or other structures, by means including the use of the auxiliary form locks. By this means it will be practical to remove from the hardened concrete wall form sections so as to expose portions of the wall which may be subject to a finishing operation. In other words should one of the upper form sections be removed, scaffolding could be attached immediately therebelow, in the manner heretofore described, and thus the upper section would be immediately accessible for an operator to complete a desired operation thereon.

The manufacture of the forms which cooperate with the various locks may be by any of the methods shown, it being practical to stamp out from the angles the cams which cooperate with the lock as shown in Fig. 6.

Various minor changes in the details of construction, operation and combination of parts, may be made without departing from the spirit of the invention, the latter embodying primarily the novel form sections and the cooperating locks permitting a multiplicity of uses and operating as heretofore defined.

What I claim is:

1. A form for use in molding concrete assemblies embodying a plurality of connected sections and form connecting tie members, each of said sections comprising a frame formed on angle-stock and including flanges defining the outer marginal edges of said sections, said flanges having cooperating off-set portions to provide pockets for receiving said form connecting tie members, aligned openings formed through the flanges and said tie member, inclined projections formed about the openings on the outer face of one of the angle members, retaining cups secured about the openings of the other angle member, a lock bolt extending through the openings in the several parts and having projections at one extremity for engaging the inclined projections to lock said tie connection in said pockets, and said projections also engaging within the retaining cup when said lock bolt is retracted for securing the same to the attached angle member.

2. A concrete molding form embodying a pair of spaced panels each formed of a plurality of connected sections and connected by tie plates, said connected sections including frames formed of angle-stock, the flanges of the angles of each section abutting and having registering openings, cams struck from one of each pair of abutting flanges about each opening, lock members extending through the registering openings, said lock members being formed with radial extensions for cooperation with said cams, and means carried by one of each of said flanges for engaging said extensions when the lock member is retracted to secure said lock member against separation therefrom.

3. A concrete form including adjacent frames having abutting flanges, said flanges being formed with registering openings, cam surfaces formed about the opening of one of the abutting flanges, a lock bolt having projecting portions for cooperating with said cam surfaces to secure said flanges together, and means carried by the other flanges and enclosing each opening therein for securing said bolts against removal therefrom.

4. A concrete molding form embodying a pair of spaced panels each formed of a plurality of connecting sections and connected by tie plates, said connecting sections including frames formed of angle-stock, the projecting flanges of each section abutting the projecting flanges of the adjacent section and the abutting flanges having registering openings formed therein, cam surfaces formed about the openings of one of each abutting pair of angles, retaining caps secured about the openings of the other abutting flange of each section, a lock bolt having lateral projections adapted to engage the cam surfaces for securing the sections together and said projections being adapted to be confined in retaining cups upon movement to retracted position, intermediate angles bracing each section, tie members connecting the intermediate angles, and lock bolts detachably securing the tie members to the brace members.

5. In a concrete form including spaced panels each formed of separable sections, the sections of each panel including frames formed of angle-stock, flanges of each of the sections being adapted to abut in assembly and having registering offset portions for receiving connecting tie members, transverse openings formed through the abutting flanges at their offset portions and through the connecting tie members, cam portions formed about the openings of the flange of each abutting pair of flanges, lock bolts extending through the registering openings in the several parts and having extensions for cooperation with the cam portions for securing the parts together, and means for connecting the lock bolt to one of the flange members when the lock bolt is in retracted position to prevent separation of these parts.

6. In a concrete form including spaced panels each formed of separable sections, the sections of each panel including marginal flanges and the flanges of certain sections being adapted to abut in assembly and having registering openings formed therein, a ring formed with spaced cam tracks secured at the openings of one of the abutting flanges, a lock bolt extending through said registering openings having lateral projections for engagement with said cam tracks to cause the abutting parts to be secured together, and housings secured about the opening in the other flange confining the projecting terminal of said bolt upon retraction from engagement with said cam tracks.

7. A concrete wall panel including a pair of adjacently arranged sections, each section being provided with marginal flanges and the adjacent flanges of each section normally abutting in assembly, said flanges being offset at opposed points to provide tie receiving recesses, the offset portions of said flanges and said ties each being provided with registering openings, spaced cam surfaces struck from one of the opposing flanges adjacent each of the openings therein, a lock bolt, said bolt being adapted to extend through the openings and having radial extensions at one extremity for engaging said cam surfaces, the openings formed in the other flange being of such dimensions as to normally receive the radial extensions formed at the extremity of said bolt, and means secured to the outer face of the latter flange for limiting the outward movement of the radial extensions of said bolt to a point defined by the inner marginal surface thereof.

8. The substance of claim 7 characterized in that the means secured to the flange to limit the movement of the retracted bolt comprises a concave member which forms with said flange a housing with openings.

9. In a form including a plurality of cooperating panel sections each embodying abutting marginal flanges, said abutting flanges being formed with registering openings, the outer marginal edge portion defining the openings of one of the abutting flanges having fixed thereto spaced cam surfaces, portions of said abutting flanges adjacent spaced registering openings being offset to provide tie receiving pockets, the other abutting flange having secured about the openings extending through the offset portions cylindrical caps, lock members adapted to extend through the openings to engage the spaced cam portions, the lock members extending through the offset portions including lateral projections so formed and arranged as to be received within the caps upon retraction of the lock members, and means for adjusting and operating each of said lock members.

10. The substance of claim 9 characterized in that the cam faces formed adjacent the openings are provided by projecting portions of the flange in a manner to provide the necessary extensions.

11. In a form section for molding concrete, connecting fabricated angle members including flanges, one of said flanges being formed with spaced openings each of which has its marginal edge portion provided with diametrically positioned opposed cam surfaces and another flange provided with spaced openings having overlying caps formed with aligned openings and lock members adapted to extend through said aligned openings and having enlarged cam engaging head portions constructed and arranged to be received in said caps when the lock members are in inoperative position.

12. The substance of claim 11 characterized in that all of the openings in the flanges are of key-slot shape.

13. The substance of claim 12 characterized in that each of the flanges is formed with at least one key-slot opening.

14. In a concrete form including a panel section defined by marginal flanges, an intermediately arranged brace of angle form, a U-shaped member having its leg extremities secured to one leg of the angle member, aligned openings formed in the angle member and in the central portion of the U-shaped member, a tie plate having an opening formed at one extremity for registration with the opening in the U-shaped member, the opening in the tie plate being of key form and extending beyond the walls of the opening of the U-shaped member at diametrically opposed points, a stud bolt, said stud bolt being provided with an extremity for engaging the opening in the angle member, a collar formed on the stud bolt intermediate its length shaped to seat in the key opening in the tie extremity, and a threaded nut engaging the opposite end of the stud bolt for adjusting the same with respect to the tie member.

15. In a concrete form including spaced sectional walls and connecting tie members, each section of each wall including outwardly projecting marginal portions adapted to abut the adjacent projecting portion of the adjacent section, said abutting projecting portion being formed with a multiplicity of off-set registering areas to provide pockets for receiving the end portions of the connecting tie members, removable connecting elements carried by one of said sections for securing the tie members between the offset portions of the projecting members whereby said sections may be separated after formation of the wall permitting the extremities of the tie members to project, scaffolding elements, said scaffolding elements having portions for connection with the projecting extremities of the tie members, and removable connecting elements for securing the scaffolding elements to said tie members.

16. In a wall mold, a mold section including an angle member formed with a key slot opening, a retainer cap fixed to said angle member and overlying said opening, said retainer cap being formed with a bolt opening in axial alignment with the key slot opening in said angle member, a tie rod including an extremity having a key slot, for axial alignment with the openings in the cross member and retainer, and a bolt for securing said parts together, said bolt including an enlarged extremity for locking said tie member to said angle member and for retraction within said retainer cap to prevent displacement when in inoperative position, the opposite end of said bolt being threaded, and a threaded member engaging said threaded extremity for axial adjustment of said bolt to adjust the bolt locking position.

WILLIAM H. KRUEGER.